US009695735B2

(12) United States Patent
Auweder

(10) Patent No.: US 9,695,735 B2
(45) Date of Patent: Jul. 4, 2017

(54) THERMOSTAT VALVE WITH COOLANT STOPPAGE FUNCTION

(75) Inventor: Andreas Auweder, Vaihingen/Enz (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 491 days.

(21) Appl. No.: 13/990,529

(22) PCT Filed: Nov. 29, 2011

(86) PCT No.: PCT/EP2011/071329
§ 371 (c)(1),
(2), (4) Date: May 30, 2013

(87) PCT Pub. No.: WO2012/072654
PCT Pub. Date: Jun. 7, 2012

(65) Prior Publication Data
US 2013/0240634 A1   Sep. 19, 2013

(30) Foreign Application Priority Data

Nov. 30, 2010   (DE) .................. 10 2010 062 206

(51) Int. Cl.
F01P 7/02 (2006.01)
F01P 7/16 (2006.01)
(Continued)

(52) U.S. Cl.
CPC .............. F01P 7/16 (2013.01); *F01P 7/165* (2013.01); *F01P 2007/146* (2013.01); *G05D 23/22* (2013.01)

(58) Field of Classification Search
CPC .... F01P 2007/146; F01P 7/165; G05D 23/022
(Continued)

(56) References Cited

U.S. PATENT DOCUMENTS 4,086,041 A * 4/1978 Takada ................ F04C 29/02
417/295
4,196,847 A    4/1980 Gobien
(Continued)

FOREIGN PATENT DOCUMENTS

DE    75 14 366 U    8/1975
DE    27 55 466 A1   6/1979
(Continued)

OTHER PUBLICATIONS

International Search Report, PCT/EP2011/071329, Feb. 22, 2012, 3 pgs.
German Search Report, DE 10 2010 062 206.0, Jun. 9, 2011, 8 pgs.

*Primary Examiner* — Marc Norman
*Assistant Examiner* — Daniel C Comings
(74) *Attorney, Agent, or Firm* — Paul D. Strain, Esq.; Strain & Strain PLLC

(57) ABSTRACT

The invention relates to a thermostat valve for a cooling system of an internal combustion engine with a coolant stoppage function, comprising a first bypass valve element and a second bypass valve element, a main valve element to be arranged in a counterpart to a connection to a coolant radiator, and a crossmember to be arranged between an engine outlet and an engine inlet, which crossmember forms a valve seat for the first bypass valve element and the second bypass valve element, wherein, on its outer side, the crossmember has a collar which forms an axial supporting region for the counterpart and which is loaded in the axial direction by a compression spring, with the result that the collar is forced in the direction of the counterpart.

12 Claims, 4 Drawing Sheets

(51) Int. Cl.
*G05D 23/22* (2006.01)
*F01P 7/14* (2006.01)

(58) Field of Classification Search
USPC .................................................. 236/34.5, 34
See application file for complete search history.

(56) References Cited

U.S. PATENT DOCUMENTS

| 5,231,955 | A | * | 8/1993 | Saur ........................ F01P 7/167 |
| | | | | 123/41.1 |
| 5,494,005 | A | | 2/1996 | Saur |
| 8,091,517 | B2 | | 1/2012 | Auweder et al. |
| 2009/0205589 | A1 | * | 8/2009 | Auweder ............. G05D 23/022 |
| | | | | 123/41.09 |

FOREIGN PATENT DOCUMENTS

| DE | 44 27 340 A1 | 2/1995 |
| DE | 44 16 554 A1 | 11/1995 |
| DE | 195 45 081 A1 | 6/1997 |
| DE | 103 18 813 A1 | 11/2004 |
| DE | 10 2004 021 009 A1 | 11/2005 |
| DE | 10 2006 025 064 A1 | 11/2007 |
| EP | 2 104 015 A2 | 9/2009 |
| WO | WO 2007/134808 A1 | 11/2007 |

\* cited by examiner

THERMOSTAT VALVE WITH COOLANT STOPPAGE FUNCTION

CROSS-REFERENCE TO RELATED PATENT APPLICATIONS

This application is a National Stage of International Application No. PCT/EP2011/071329, filed Nov. 29, 2011, which is based upon and claims the benefit of priority from prior German Patent Application No. 10 2010 062 206.0, filed Nov. 30, 2010, the entire contents of all of which are incorporated herein by reference in their entirety.

The invention relates to a thermostat valve for a cooling system of an internal combustion engine with coolant stoppage function, comprising a first short-circuit valve element and a second short-circuit valve element.

Thermostat valves for cooling systems of internal combustion engines comprise a main valve arranged between an engine outlet or an engine inlet and a coolant cooler, and a short-circuit valve arranged between the engine inlet and engine outlet. In a warm-up phase of an engine, in the case of conventional thermostat valves, the main valve is closed and the short-circuit valve is open, such that in the warm-up phase, a coolant is not conducted via the coolant cooler.

To shorten a warm-up phase, thermostat valves with a so-called coolant stoppage function are known, wherein both the main valve and also the short-circuit valve are closed during the warm-up phase.

WO 2007/134808 A1, for example, discloses a thermostat valve for engine outlet regulation with initially stationary coolant, wherein in addition to a first short-circuit valve element in the form of a valve slide, there is provided a second short-circuit valve element in the form of a valve plate. The valve plate and the valve slide are realized as an integral component and are connected to a working piston of a thermostatic working element. Here, the valve plate is positioned in front of the valve slide in a deployment direction of the working piston. A traverse is arranged between the engine inlet and engine outlet, which traverse forms both a valve seat for the valve slide and also a valve seat for the valve plate.

It is an object of the present invention to provide a thermostat valve with a coolant stoppage function, which thermostat valve permits simple manufacture and assembly.

Said object is achieved by means of a thermostat valve for a cooling system of an internal combustion engine, comprising a first short-circuit valve element and a second short-circuit valve element, a main valve element for arranging with respect to a connector to a coolant cooler, and a traverse for arranging between an engine outlet and an engine inlet, which traverse forms valve seats for the first short-circuit valve element and the second short-circuit valve element, wherein the traverse has, on its outer side, a collar which forms an axial abutment region for the counterpart and which is loaded in an axial direction by a compression spring such that the collar is forced in the direction of the counterpart.

In one embodiment, the thermostat valve is in the form of a thermostat insert. In other embodiments, the thermostat valve is formed as an integral thermostat or housing thermostat. Depending on the position of the main valve element and of the first short-circuit valve element, a coolant flow is conducted by the cooling system or entirely or partially via a short-circuit duct that bypasses the cooling system. By means of the second short-circuit valve element, a closure of the short-circuit duct when the main valve element is closed, and thus a coolant stoppage function, is realized.

In connection with the invention, a traverse refers to a component which is arranged in a short-circuit duct between an engine outlet and engine inlet. The traverse has at least one opening, also referred to as a short circuit, designed as a valve seat for the first and the second short-circuit valve element.

In connection with the invention, an axial abutment region refers to a region which the counterpart makes contact with for an at least unilateral transmission of forces acting in an axial direction. The axial abutment region permits simple assembly by insertion of the traverse into a counterpart. Necessary bearing forces are imparted by means of the compression spring. Here, the axial abutment region is, in one embodiment, formed by a contact line. In other embodiments, areal contact is provided over a contact area. In some embodiments, the collar of the traverse has grooves or recesses for a leakage flow, wherein the abutment region has a plurality of portions spaced apart from one another in a circumferential direction.

In one embodiment, the traverse is inserted sealingly into the short-circuit duct, wherein a coolant flow is possible only via an opening provided in the traverse. For this purpose, in one embodiment, sealing elements are provided. Alternatively or in addition, the traverse is manufactured from a material which has sealing properties in interaction with a counterpart.

In other embodiments, it is provided that there remains a leakage flow via the collar and/or through an opening in the traverse. By means of the leakage flow, it is ensured that, even in the event of a coolant stoppage, there is a sufficient flow around an element which can be actuated in a temperature-dependent manner and which is arranged in a distributor chamber between main valve and short-circuit valve.

In one embodiment, the traverse is produced in a two-component plastics process. In one embodiment, the traverse is produced from a thermoplastic, for example a hydrolysis-stabilized, glass-fiber-reinforced polyamide (PA), in particular PA 66, and from a soft component, for example an elastomer material such as ethylene propylene diene monomer (EPDM). In other embodiments, as a soft component, use is made of a thermoplastic material, for example a thermoplastic elastomer (TPE). In yet further embodiments, the traverse is manufactured entirely or partially as a metal part, in particular as a punched part.

The at least one opening in the traverse is opened as a function of a pressure ratio and/or a temperature, or is closed off by the first or the second short-circuit valve element. In one embodiment, the compression spring forms the restoring element for the first short-circuit valve element and/or the main valve element. In one embodiment, for this purpose, the compression spring is supported on the main valve plate. The compression spring is suitably dimensioned such that a desired opening and closing behavior is attained. The main valve element and the first short-circuit valve element are preferably conjointly adjustable counter to the force of the compression spring.

In one embodiment, the main valve element, the first short-circuit valve element and the second short-circuit valve element are coupled to a common drive element for a transmission of movement, wherein preferably the first short-circuit valve element and/or the main valve element are coupled to the drive element with an idle travel. In connection with the invention, an idle travel refers to a distance over which the drive element and the first short-circuit valve element and/or the main valve element are displaceable relative to one another. The second short-circuit valve element is preferably mounted in front of the first short-circuit valve element as viewed in a direction of actuation, wherein in a warm-up phase, the second short-circuit valve element closes off the short-circuit duct. Owing to the idle travel, a stroke of the drive element is initially not transmitted to the first short-circuit valve element and/or to the main valve element. Only when a stroke exceeds a definable threshold does an adjustment movement take place. The second short-circuit valve element is preferably coupled to the drive element without an idle travel. In other embodiments, there is provided between the second short-circuit valve element and the drive element an idle travel which is however smaller than the idle travel of the first short-circuit valve element and/or of the main valve element, such that an adjustment of the second short-circuit valve element by means of the drive element is possible without actuation of the first short-circuit valve element and/or of the main valve element. In the case of a coupling of the main valve element with an idle travel, a temperature-dependent actuation of the second short-circuit valve element is possible without a transmission of movement to the main valve element in a first warm-up phase. If the first short-circuit valve element is coupled to the drive element with an idle travel, an adjustment of the first short-circuit valve element is initially prevented during an adjustment of the second short-circuit valve element. In this way, an undesired fast closing of the short-circuit duct by the first short-circuit valve element is prevented. In advantageous embodiments, a pressure-dependent actuation of the second short-circuit valve element is also possible. Here, if the movement of the second short-circuit valve element is transmitted to the drive element, the idle travel prevents a further transmission to the main valve element and/or to the first short-circuit valve element. In other embodiments, a transmission of the movement of the second short-circuit valve element to the drive element is prevented.

In one refinement of the invention, at least two differently designed restoring elements are provided, wherein the first short-circuit valve element is mounted so as to be adjustable counter to the force of the first restoring element and the second short-circuit valve element is mounted so as to be adjustable counter to the force of the second restoring element, wherein in particular the first and the second restoring elements are supported on opposite sides of the traverse. The restoring elements are preferably designed in each case as compression springs. Here, the compression spring which acts on the second short-circuit valve element is designed to be suitable for ensuring an overpressure function. In the case of an engine outlet regulation configuration, the compression spring acting on the second short-circuit valve element acts as a pressure difference spring. In the case of an engine inlet regulation configuration, a suitable design of the restoring elements is provided taking into consideration the geometries of the effective surfaces.

In one refinement of the invention, the traverse has a retention element device for the second restoring element, wherein the retention element device preferably has at least two retention arms which project in an axial direction. In this way, it is possible to dispense with further components for retention, and a compact structural unit is provided. In other embodiments, an additional component is provided for the second restoring element. In yet further embodiments, the restoring element is supported on the counterpart.

In further embodiments, the main valve element and the first short-circuit valve element are formed as an integral component. An integral component refers to a component that is produced in one piece or to individual parts which are rigidly connected to one another at least in an axial direction. In one embodiment, the integral component is dimensioned such that, during the displacement of the valve unit, the connector to the coolant cooler is opened first, wherein the short-circuit duct still remains open for mixed operation. Only in the event of a further adjustment does the first short-circuit valve element close the short-circuit duct.

In a further embodiment, a base element is provided which forms a main valve seat, wherein the traverse and the base element are connected so as to be displaceable to a limited extent counter to the force of the compression spring. In the case of an embodiment of the thermostat valve as a thermostat insert, the base element is preferably designed as a base plate. In the case of an embodiment of the thermostat valve as an integral thermostat or housing thermostat, the base element is designed as a thermostat cover. By means of the traverse and the base element, a preassembled structural unit is provided which can be installed in a simple manner at the final assembly stage. In advantageous embodiments, the compression spring is inserted between the traverse and the base element and is supported on the traverse and, via the main valve element, on the base element. Here, in one embodiment, the traverse has at least two webs which are mechanically connected to corresponding lugs of the base element. In one refinement, the webs and the lugs are formed as corresponding brackets and hooks, wherein the hooks are hooked, in particular so as to be displaceable to a limited extent, into the brackets. Owing to the displaceable connection, it is possible for the components to move relative to one another during assembly, and thus the traverse is forced in the direction of a counterpart surface of the counterpart owing to the force of the compression spring.

In advantageous embodiments, the main valve element is designed as a valve plate. In other embodiments, a diagonal valve is provided as a main valve, such as is described for example in the unpublished application DE 102009042496.2. In one embodiment, the first short-circuit valve element is in the form of a valve plate. In other embodiments, the first short-circuit valve element is designed as an annular slide, wherein the traverse has a slide valve seat which is provided on an inner circumference of an opening and which can be closed by means of the short-circuit valve element. The first short-circuit valve element and the valve seat have shapes corresponding to one another, and preferably, both are of rotationally symmetrical, in particular cylindrical form, such that a relative rotation of the components is possible without jamming during the displacement of the first short-circuit valve element. The second short-circuit valve element is preferably in the form of a valve plate, in particular a conical valve plate. The conical valve plate tapers preferably in the direction of the drive element. In other embodiments, an opening angle of the conical valve plate points in the direction of the drive element. In one embodiment, the first and the second short-circuit valve element are realized on a common component. It is however preferable for the short-circuit valve elements to be realized on separate components in order to permit separate adjustability. Here, the short-circuit valve elements preferably interact in each case with a dedicated restoring element, wherein the restoring element of the first short-circuit valve element prevents an undesired closure of the short-circuit valve during a pressure-loss-dependent opening movement of the second short-circuit valve element.

In advantageous embodiments, a thermostatic drive element is provided which has a working piston which can be driven out of a housing of the drive element, wherein the main valve element, the first short-circuit valve element and the second short-circuit valve element are connected, for a transmission of movement, to the element which is moved as the working piston is driven out of the housing. Here, depending on the arrangement of the working element, the housing or the working piston can be moved as the working piston is driven out.

Further advantages of the invention will emerge from the subclaims and from the following description of exemplary embodiments of the invention, which are schematically illustrated in the drawings. In the drawings, consistent reference signs have been used for identical or similar components. Features described or illustrated as part of an exemplary embodiment may likewise be used in another exemplary embodiment in order to realize a further embodiment of the invention.

In the drawings, in each case in cross section:

Figure 4:
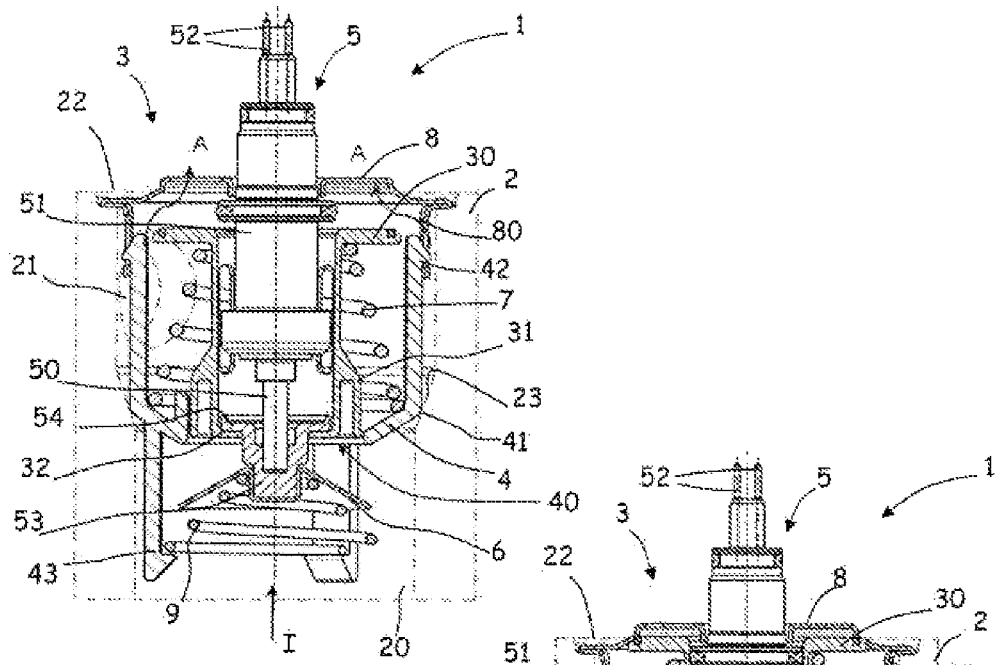
FIG. 4 shows the thermostat valve, designed as a thermostat insert, as per FIG. 1 in an outlet regulation configuration in cooler mode.

FIGS. 1 to 4 schematically show a first exemplary embodiment of a thermostat valve 1, designed as a thermostat insert, illustrated in an engine outlet regulation configuration, outlet regulation for short, in a coolant stoppage state (FIG. 1), in overpressure mode (FIG. 2), in mixed mode (FIG. 3), and in cooler mode (FIG. 4). Fluid flows of a coolant are indicated by arrows A.

The thermostat valve 1 is arranged in a counterpart 2 which is designed as a housing and which has an engine inlet 20, an engine outlet 21 and a connector 22 to a coolant cooler. A main valve element 30 is arranged between the engine outlet 21 and the connector 22 to the coolant cooler, wherein the thermostat valve 1 regulates a fluid flow, emerging from the engine, via the coolant cooler or via the short-circuit duct. Between the engine outlet 21 and the engine inlet 20 there is arranged a traverse 4 with an opening 40, which traverse forms valve seats for a first short-circuit valve element 31 and a second short-circuit valve element 6. In the exemplary embodiment illustrated, the first short-circuit valve element 31 is designed as an annular slide which interacts with a valve seat formed on an inner circumference of the opening 40. The second short-circuit valve element 6 is designed as a valve plate which interacts with an edge of the opening 40. A space formed between the main valve element 30 and the traverse 4 is also referred to as a distributor chamber.

The traverse 4 has, on its outer side, an encircling collar 41 which forms an axial abutment region and which bears against a counterpart surface 23 on the counterpart 2. In the exemplary embodiment illustrated, the counterpart surface 23 is in the form of an oblique surface. In this way, a self-centering arrangement of the traverse 4 is possible. In other embodiments, an annular shoulder is provided on the counterpart 2. The collar 41 is loaded in or counter to an axial direction I by a compression spring 7, such that the collar 41 is forced in the direction of the counterpart surface 23 of the counterpart 2. Here, the compression spring 7 is supported via the main valve element 30 on a base element designed as a base plate 8. The base plate 8 is mounted in a positionally fixed manner in or on the counterpart 2. In the exemplary embodiment illustrated, the main valve element 30 is designed as a valve plate, also referred to as a main plate. A main valve seat is formed on the base plate 8. In the embodiment illustrated, the base plate 8 is designed as a punched part. In other embodiments, a plastics element is provided as a base plate 8.

The traverse 4 has at least two bracket-like webs 42. The webs 42 extend in an axial direction I in the direction of the base plate 8. The base plate 8 has lugs 80 into which the webs 42 are hooked, such that a cage is formed.

The thermostat valve 1 also comprises a drive element which is designed as a thermostatic drive element 5 with a working piston 50 which can be driven out of a housing 51 of the working element 5. The thermostatic drive element 5 illustrated is in the form of an expansion-material working element, wherein the housing 51 is filled with an expansion material which changes its volume in a temperature-dependent manner and thus, in the event of a corresponding temperature increase, drives the working piston 50 out of the housing 51. The working element 5 illustrated also comprises terminals 52 which permit electronic actuation. In the exemplary embodiment illustrated in FIGS. 1 to 4, the housing 51 is mounted in a positionally fixed manner, wherein the working piston 50 is moved relative to the housing 51.

The main valve element 30, the first short-circuit valve element 31 and the second short-circuit valve element 6 are coupled, for a transmission of movement, to the working piston 50. In the exemplary embodiment illustrated, the working piston 50 is inserted in a displaceable manner into a recess of a transmission element 53. Here, one end of the working piston 50 interacts with the base of the transmission element 53, such that in the event of a deployment of the working piston 50, the movement is transmitted to the transmission element 53. By contrast, for the overpressure function, a movement of the transmission element 53 in the deployment direction of the working piston 50 is possible without the working piston 50 being driven, owing to the displaceable connection relative to the working piston 50. The second short-circuit valve element 6 is coupled, for a transmission of movement, to the transmission element 53. In the exemplary embodiment illustrated in FIGS. 1 to 4, the short-circuit valve element 6 is in the form of a punched part which is rigidly connected, owing to acting clamping forces, to the transmission element 53. In other embodiments, a screw connection or a rivet connection is provided, or for a non-rigid design, the transmission element 6 is merely pushed onto the short-circuit valve element. In yet further embodiments, a single-piece configuration of the valve plate of the short-circuit valve element or of the main valve element with the transmission element 53 is provided. For a transmission of the movement of the working piston 50 to the first short-circuit valve element 31 and to the main valve element 30, a driver 32 is provided. The driver 32 interacts, for a transmission of movement, with a portion, designed as an annular shoulder 54, of the transmission element 53. The driver 32 and the annular shoulder 54 are arranged with a spacing denoted as an idle travel X, such that a transmission of movement to the first short-circuit valve element 31 and to the main valve element 30 takes place only in the event of a stroke of the working piston 50 which exceeds the idle travel X. By contrast, the compression spring 9 forces the transmission element 53 against the working piston 50, such that a movement of the working piston 50 in an opening direction without the second short-circuit valve element 6 being driven by the compression spring 9 is prevented.

In the exemplary embodiment illustrated, the main valve element 30, the first short-circuit valve element 31 and the driver 32 are realized as a common component 3. In other embodiments, the main valve element 30 and the first short-circuit valve element 31 are manufactured as one component which is connected, for a transmission of movement, to a driver 32. Here, in order to ensure a good flow around the housing 51, passage openings are provided in a region, which connects the main valve element 30 to the first short-circuit valve element 31, of the component 3.

The working piston 50 is driven out counter to the force of the first compression spring 7 and of the second compression spring 9 which is supported between the traverse 4 and the second short-circuit valve element 6. For this purpose, the traverse 4 has retention arms 43 which support the compression spring 9.

As the working piston 50 is driven out, owing to the idle travel X, initially only the second short-circuit valve element 6 is moved. The movement thus takes place counter only to the force of the second compression spring 9. Only when the stroke of the working piston 50 exceeds the idle travel X does the compression spring 7 counteract the movement. By contrast, in the case of a stroke which does not exceed the idle travel X, the compression spring 7 holds the main valve plate 30 against its valve seat and holds the first short-circuit valve element 31 at a distance from the associated valve seat.

For assembly, the thermostatic working element 5 and the compression springs 7, 9 are inserted, together with the main valve element 30, the transmission element 53 and the short-circuit valve element 6, into the traverse 4, and the traverse 4 is connected to the base plate 8. For this purpose, the traverse 4 is displaced in the direction of the base plate 8 counter to the force of the compression spring 7, and the webs 42 of the traverse 4 are hooked into the lugs 80, with the compression spring 7 being compressed. Owing to the restoring force of the compression spring 7, after a withdrawal of the force required for the compression, the traverse 4 is mechanically connected to the base plate 8, such that an assembly is formed. The lugs 80 of the base plate 8 and the webs 42 of the traverse 4 are displaceable relative to one another counter to the force of the compression spring 7 even after a hooking-in process.

Figure 1:
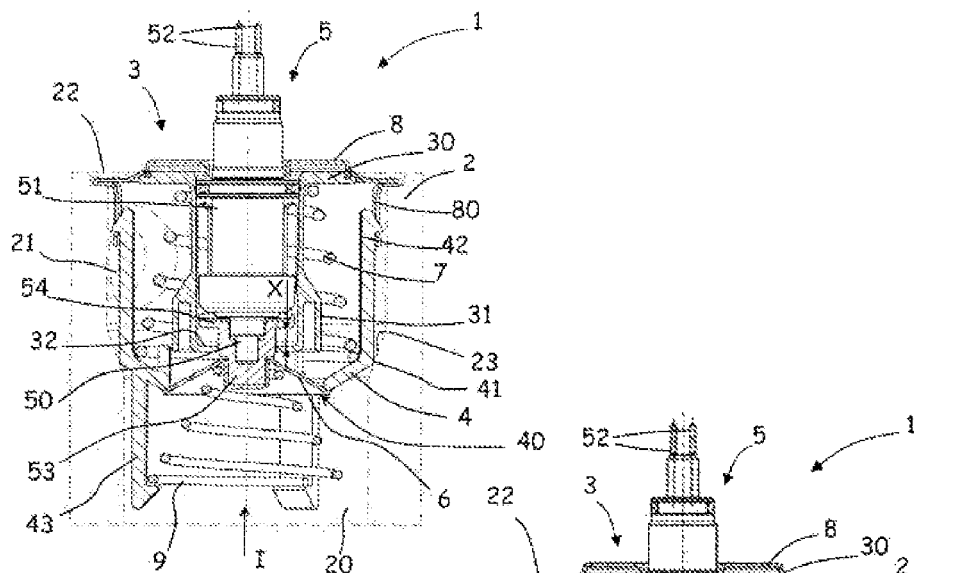
FIG. 1 shows an exemplary embodiment of a thermostat valve, designed as a thermostat insert, in an outlet regulation configuration in a coolant stoppage state.

During operation, in a warm-up phase, the coolant flow is initially stopped, as illustrated in FIG. 1, because the second short-circuit valve element 6 bears against the associated valve seat on the traverse 4, and thus closes the opening 40, owing to the restoring force of the compression spring 9. In the case of cold coolant, an undesirably high pressure can be generated in the cooling circuit owing to high engine rotational speeds. An overpressure function is therefore provided in the thermostat valve 1. If, in the warm-up phase, a pressure difference between the distributor chamber and short-circuit duct exceeds a defined value, the opening 40 is opened, counter to the force of the compression spring 9, owing to the compression force acting on the short-circuit valve element 6.

For engine outlet regulation, a pressure difference required for the opening is determined from the quotient of a restoring force of the compression spring 9 and a surface area of the short-circuit valve element 6.

Figure 2:
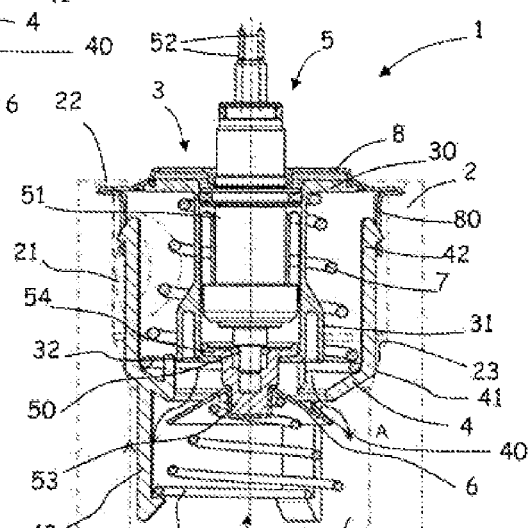
FIG. 2 shows the thermostat valve, designed as a thermostat insert, as per FIG. 1 in an outlet regulation configuration in overpressure mode.
Figure 3:
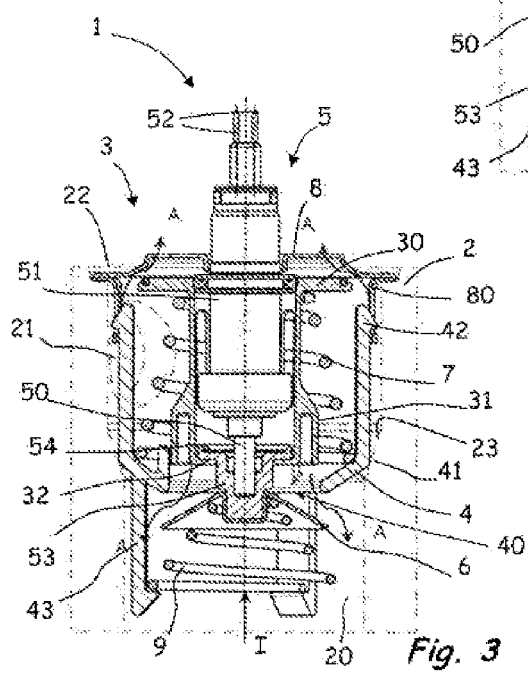
FIG. 3 shows the thermostat valve, designed as a thermostat insert, as per FIG. 1 in an outlet regulation configuration in mixed mode.

FIG. 2 shows the overpressure mode, wherein the short-circuit valve element 6 has been adjusted counter to the force of the compression spring 9. Here, the transmission element 53 which is coupled to the second short-circuit valve element 6 is likewise displaced. In the exemplary embodiment illustrated, the transmission element 53 is coupled in a displaceable manner to the working piston 50. The movement of the transmission element 53 is therefore not transmitted to the working piston 50. Owing to the idle travel X (see FIG. 1) between the driver 32 and the transmission element 53, a movement of the first short-circuit valve element 6 is not transmitted via the transmission element 53 to the component 3. The first short-circuit valve element 31 thus remains in the open position and is held in said position by the compression spring 7. A reliable overpressure function is ensured in this way.

In the case of a cold cooling medium, and in the event of the second short-circuit valve element 6 closing the opening 40 owing to the temperature, an overpressure function protects other assemblies (not illustrated) situated in the cooling circuit against excessively high pressures.

In order to attain temperature-dependent opening in addition to an overpressure function, a leakage duct (not illustrated) is provided in the traverse 4, which leakage duct enables a fluid flow out of the distributor chamber to flow to the housing 51. In one embodiment, the leakage duct is realized by a groove on an outer circumference of the traverse 4. In other embodiments, openings are provided in a plate-like region of the traverse 4.

The housing 51 is filled with an expansion material which changes its volume in a temperature-dependent manner. In the event of the expansion material in the housing 51 being heated, the working piston 50 is driven out of the housing 51. Here, one end of the working piston 50 interacts with the transmission element 53, such that the movement is transmitted to the transmission element 53. Owing to the idle travel X between the transmission element 53 and driver 32, the component 3 and thus the main valve element 30 and the first short-circuit valve element 31 initially remain in the position illustrated in FIG. 1. Only when the idle travel X is overcome (see FIG. 1) are the component 3 and thus the main valve element 30 and the first short-circuit valve element 31 displaced. A mixed mode (cf. FIG. 3) or a cooling mode (cf. FIG. 4) is thus set depending on the temperature.

Figure 5:
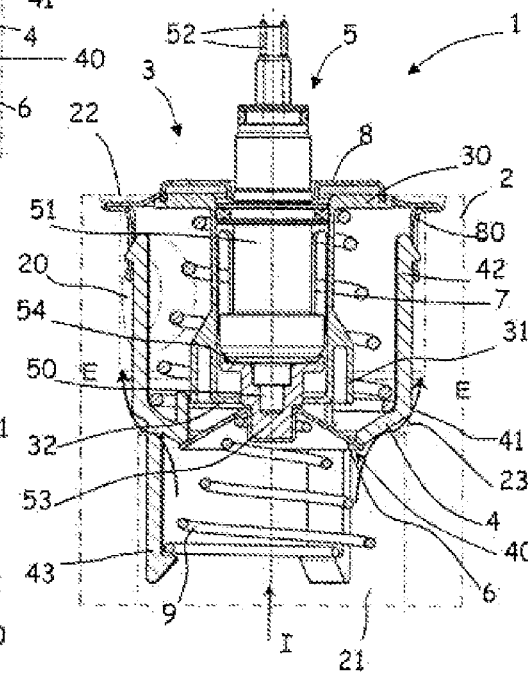
FIG. 5 shows a thermostat valve, designed as a thermostat insert, as per FIG. 1 in an inlet regulation configuration in a first overpressure mode.
Figure 6:
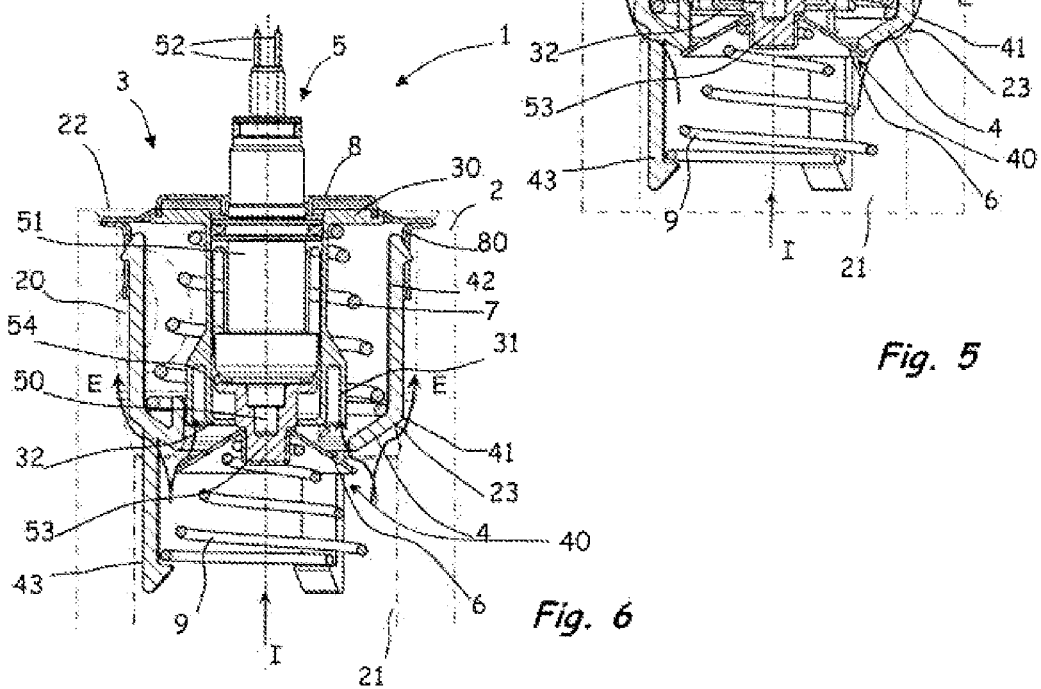
FIG. 6 shows a thermostat valve, designed as a thermostat insert, as per FIG. 5 in an inlet regulation configuration in a second overpressure mode.

FIGS. 5 and 6 schematically show the thermostat valve 1, designed as a thermostat insert, as per FIGS. 1 to 4 in an illustration of an engine inlet regulation configuration, inlet regulation for short, in two overpressure mode functions. Here, the components correspond to FIGS. 1 to 4, and consistent reference signs have been used for identical components. A repeated description of the components will not be given. By contrast to the exemplary embodiment according to FIGS. 1 to 4, which relate to an engine outlet regulation configuration, it is the case in the engine inlet regulation configuration that the main valve element 30 is arranged between an engine inlet 20 and a connector 22 to a coolant cooler. The fluid flows in the case of an engine inlet regulation configuration are indicated by arrows E.

As can be seen in FIGS. 5 and 6, in the case of an engine inlet regulation configuration, in the event of an overpressure occurring, the traverse 4 is displaced counter to the force of the compression spring 7 or counter to the force of the compression springs 7 and 9. Here, owing to the pressure which occurs, the second short-circuit valve element 6 is initially also displaced with the traverse 4. The compression spring 9 forces the second short-circuit valve element 6 and thus the transmission element 53 into contact with the working piston 50, such that the movement of the short-circuit valve element 6 is transmitted to the working piston 50. Owing to the movement of the second short-circuit valve element 6, only a spacing between the base plate 8 and the traverse changes, whereas a spacing between the traverse 4 and the second short-circuit valve element 6 remains substantially constant. The traverse 4 is therefore initially moved only counter to the force of the compression spring 7 arranged between the traverse 4 and main valve element 30. The force required for this purpose is determined from a quotient of the force of the compression spring 7 and the effective surface area of the traverse 4. After a definable adjustment travel, a further adjustment of the second short-circuit valve element 6 and/or of the working piston 50 in the direction of the base plate 8 is prevented by a stop (not illustrated). Said stop also prevents damage to the thermostatic working element 5 owing to the acting pressure difference. After the stop is reached, the traverse 4 is thus displaced relative to the second short-circuit valve element 6, such that a spacing between the traverse 4 and the second short-circuit valve element 6 or the counterpart 2 changes. A further adjustment of the traverse 4 thus takes place counter to the force of both compression springs 7 and 9. The force required for this purpose is thus determined from a quotient of the sum of the forces of the compression springs 7, 9 and the difference between the effective surface areas of the traverse 4 and of the second short-circuit valve element 6.

In order, in the case of an engine inlet regulation configuration, too, to attain temperature-dependent opening in addition to an overpressure function, a leakage duct (not illustrated) is provided in the traverse 4, which leakage duct enables a fluid flow into the mixing chamber to flow to the housing 51. Here, a temperature-dependent adjustment of the working piston 50 and of the elements coupled thereto takes place analogously to that in an engine outlet regulation configuration.

Figure 7:
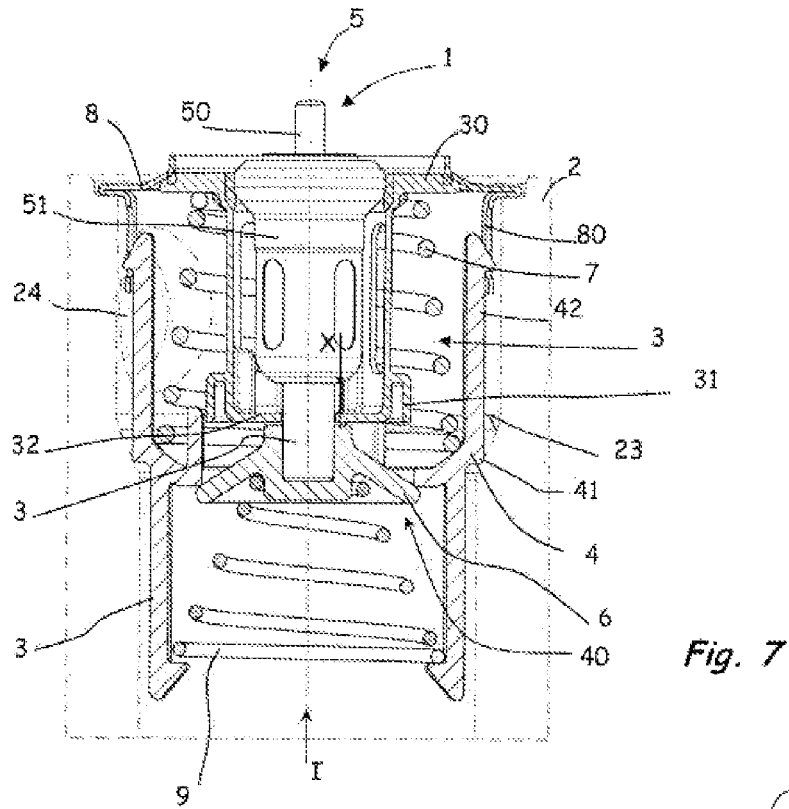
FIG. 7 shows a second exemplary embodiment of a thermostat valve, designed as a thermostat insert, in a coolant stoppage state.

FIG. 7 shows a second exemplary embodiment of a thermostat valve 1, designed as a thermostat insert, in a coolant stoppage state. Here, the components correspond, for the most part, to the components as per FIGS. 1 to 4, and consistent reference signs have been used for identical or similar components. By contrast to the exemplary embodiment according to FIGS. 1 to 4, it is the case in the embodiment according to FIG. 7 that the thermostatic working element 5 has been rotated through 180°. Here, a working piston 50 is mounted in a positionally fixed manner, and, for an adjustment movement of the valves, a housing 51 is displaced. Terminals in the housing which permit an electronic actuation are not provided here. The thermostat valve according to FIG. 7 can be used both in an engine outlet regulation configuration and also in an engine inlet regulation configuration, wherein a connector 24 leads to an engine outlet (cf. FIGS. 1 to 4) or to an engine inlet (cf. FIGS. 5 and 6).

The main valve element 30, the first short-circuit valve element 31 and the second short-circuit valve element 6 are coupled, for a transmission of movement, to the housing 51. In the exemplary embodiment illustrated, a transmission element 53 is mounted on the housing 51. The transmission element 53 is designed as a pin which projects from a side situated opposite the working piston 50. The second short-circuit valve element 6 is manufactured as a plastics part and is coupled, for a transmission of movement, to the transmission element 53. The compression spring 9 forces the second short-circuit valve element 6 into the closed position. The transmission element 53 is inserted preferably in a displaceable manner into a recess in the second short-circuit valve element 6, such that in the case of an engine outlet regulation configuration, the short-circuit valve element 6 can, in the event of an overpressure, be displaced relative to the transmission element 53 in order to open up the opening 40.

For a transmission of movement to the first short-circuit valve element 31 and the main valve element 30, a driver 32 is provided, wherein the driver 32 is coupled to a base of the housing 51 with an idle travel X, such that a transmission of movement to the first short-circuit valve element 31 and to the main valve element 30 takes place only in the event of a stroke of the housing 51 which exceeds the idle travel X. Since the base of the housing 51 interacts with the driver 32, it is possible to dispense with an annular shoulder 54 (cf. FIG. 1) on the transmission element 53.

The main valve element 30, the first short-circuit valve element 31 and the driver 32 are realized as an integral component 3. Here, in order to ensure a good flow around the housing 51, passage openings are provided in a region, which connects the main valve element 30 to the first short-circuit valve element 31, of the component 3, said region being arranged on the circumference of the housing 51.

An adjustment of the housing 51 initially takes place counter to the force of the second compression spring 9, and after the idle travel X is overcome, takes place counter to the force of the first compression spring 7 and of the compression spring 9. In the case of an engine inlet regulation configuration, the traverse 4 is, as described in FIGS. 5 and 6, initially adjustable counter to the force of the first compression spring 7, and after a stop is reached, said traverse is adjustable counter to the force of the first compression spring 7 and of the second compression spring 9. In the case of an engine outlet regulation configuration, the second short-circuit valve element 6 is adjustable counter to the force of the compression spring 9.

Figure 8:
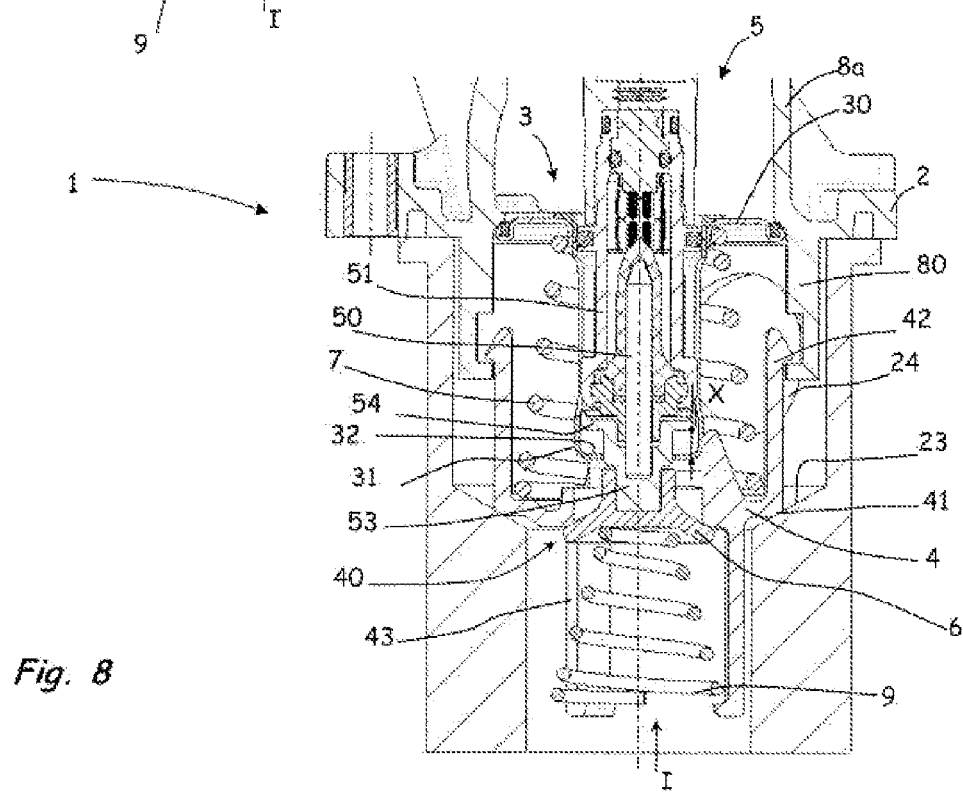
FIG. 8 shows an exemplary embodiment of a thermostat valve, designed as an integral thermostat, in a coolant stoppage state.

FIG. 8 shows an exemplary embodiment of a thermostat valve 1, designed as an integral thermostat, in a coolant stoppage state. Here, the components correspond substantially to the components as per FIGS. 1 to 4, and consistent reference signs have been used for identical or similar components. By contrast to the exemplary embodiment according to FIGS. 1 to 4, it is the case in the embodiment according to FIG. 8 that, as a base element, there is provided a thermostat cover 8a with lugs 80 into which webs 42 arranged on the traverse 4 are hooked.

In the exemplary embodiment according to FIG. 8, the first short-circuit valve element 31 is provided on a punched part 3 which is assembled with the main valve element 30 to form an integral component. A base of the punched part 3 forms the driver 32 for a transmission of the movement of the working piston 50 and thus of the transmission element 53 to the punched part 3, wherein in the coolant stoppage mode illustrated, the base is arranged spaced apart from a transmission element 53 by an idle travel X.

Figure 9:
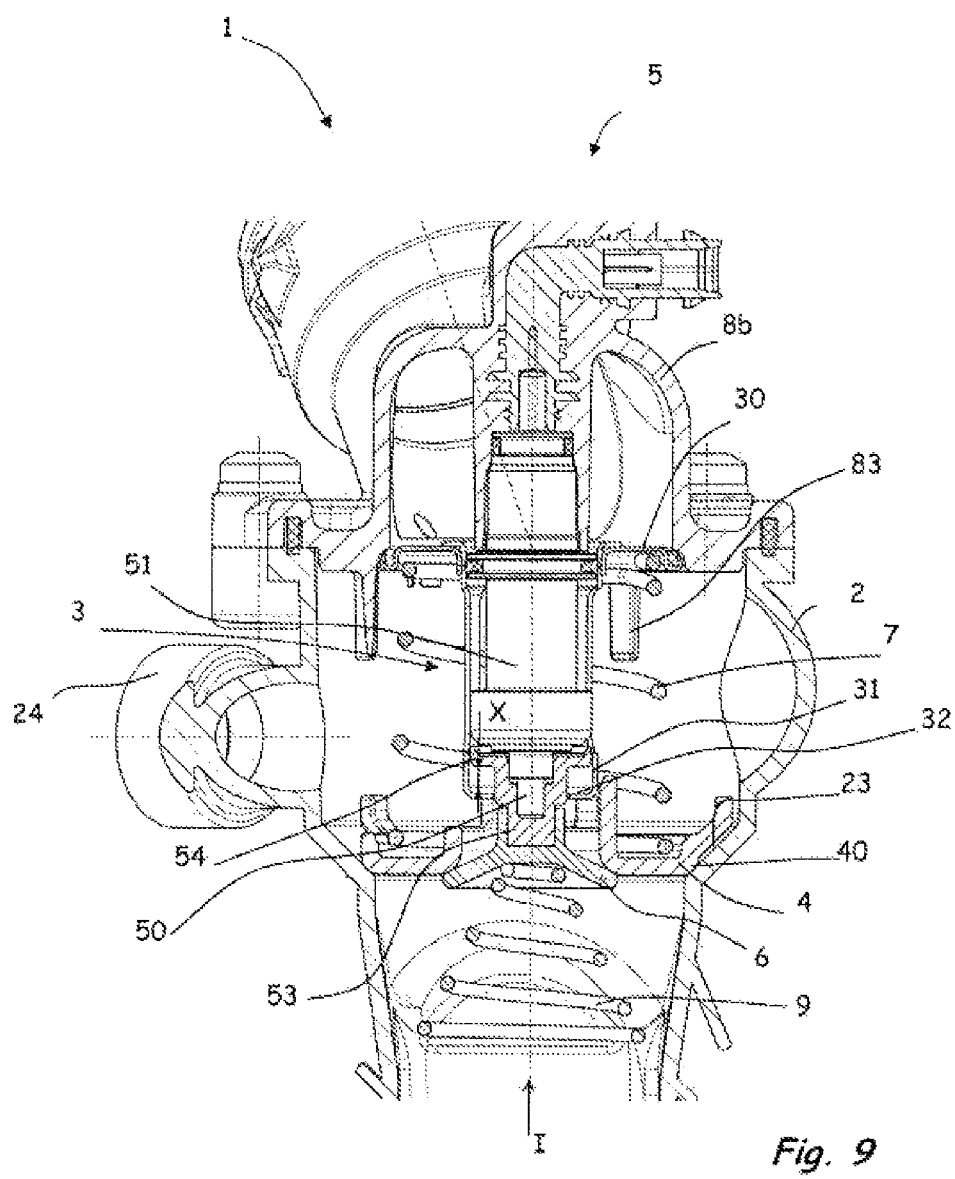
FIG. 9 shows an exemplary embodiment of a thermostat valve, designed as a housing thermostat, in a coolant stoppage state.

FIG. 9 shows an exemplary embodiment of a thermostat valve 1, designed as a housing thermostat, in a coolant stoppage state. Here, the components correspond, for the most part, to the components according to FIG. 8, and consistent reference signs have been used for identical or similar components. As in the exemplary embodiment according to FIG. 8, it is the case in the embodiment according to FIG. 9 that, as a base element, a thermostat cover 8b is provided, wherein, by contrast to the preceding exemplary embodiments, the thermostat cover 8b does not have lugs. Here, during an actuating movement, the main valve element 30 is guided by webs 83 which project from the thermostat cover 8b.

Furthermore, in the exemplary embodiment according to FIG. 9, the second compression spring 9 which interacts with the second short-circuit valve element 6 is mounted on the counterpart 2, which is designed as a housing. In the case of an engine outlet regulation configuration, an overpressure function is provided counter to the force of the second compression spring 9, as described above. Since the compression spring 9 does not engage on the traverse 4, it is by contrast the case in an engine inlet regulation configuration that the second compression spring 9 initially provides an assisting action for the opening movement, wherein the opening pressure is determined by the quotient of a difference between the restoring force of the first compression spring 7 and a restoring force of the second compression spring 9 and an effective surface area of the traverse 4. A displacement of the thermostatic working element 5 is, as described above, delimited by a stop (not illustrated). After the stop is reached, the second compression spring 9 no longer provides an assisting action. Therefore, after the stop is reached, the opening pressure is determined by the quotient of the restoring force of the first compression spring 7 and the difference between effective surface areas of the traverse 4 and of the second short-circuit valve element 6.

All of the statements made regarding the determination of the opening force are merely approximate, and a determination of the opening force is performed disregarding any hysteresis of the compression springs or non-linear spring characteristics.

All of the thermostat valves illustrated can be used in structurally identical form both for an engine inlet regulation configuration and also for an engine outlet regulation configuration. This yields advantages in terms of manufacture.

The invention claimed is:

1. A thermostat valve for a cooling system of an internal combustion engine with coolant stoppage function, comprising a first short-circuit valve element and a second short-circuit valve element, a main valve element for arranging in a counterpart with respect to a connector to a coolant cooler, a distributor chamber, and a traverse for arranging between an engine outlet and an engine inlet, wherein the traverse and the main valve element bound the distributor chamber on opposite sides of the distributor chamber, which traverse forms valve seats for the first short-circuit valve element and the second short-circuit valve element, wherein the traverse has, on its outer side, a collar which forms an axial abutment region for the counterpart and which is loaded in an axial direction by a compression spring such that the collar is forced in the direction of the counterpart, wherein at least two differently designed restoring elements are provided, wherein the first short-circuit valve element is mounted so as to be adjustable counter to the force of the first restoring element and the second short-circuit valve element is mounted so as to be adjustable counter to the force of the second restoring element, wherein the first and the second restoring elements are supported on opposite sides of the traverse, wherein the main valve element and the first short-circuit valve element are formed as an integral component.

2. The thermostat valve as claimed in claim 1, wherein the compression spring forms the restoring element for the first short-circuit valve element and the main valve element.

3. The thermostat valve as claimed in claim 1, wherein the main valve element, the first short-circuit valve element and the second short-circuit valve element are coupled to a drive element for a transmission of movement, wherein the first short-circuit valve element and the main valve element are coupled to the drive element with an idle travel.

4. The thermostat valve as claimed in claim 1, wherein the traverse has a retention element device for the second restoring element, wherein the retention element device has at least two retention arms which project in an axial direction.

5. The thermostat valve as claimed in claim 1, wherein a base element is provided which forms a main valve seat, wherein the base element and the traverse are connected so as to be displaceable to a limited extent counter to the force of the compression spring.

6. The thermostat valve as claimed in claim 5, wherein the traverse has at least two webs which are mechanically connected to corresponding lugs of the base element, wherein the webs and the lugs are formed as corresponding brackets and hooks, wherein the hooks are hooked so as to be displaceable to a limited extent, into the brackets.

7. The thermostat valve as claimed in claim 1, wherein the second short-circuit valve element is in the form of a valve plate.

8. The thermostat valve as claimed in claim 1, wherein a thermostatic working element is provided which has a working piston which can be driven out of a housing of the working element, wherein the main valve element, the first short-circuit valve element and the second short-circuit valve element are connected, for a transmission of movement, to the element which is moved as the working piston is driven out of the housing.

9. The thermostat valve as claimed in claim 7, wherein the second short-circuit valve element is in the form of a conical valve plate.

10. The thermostat valve as claimed in claim 1, wherein the main valve element and the first short-circuit valve element are produced in once piece or are rigidly connected to one another at least in an axial direction.

11. A thermostat valve for a cooling system of an internal combustion engine with coolant stoppage function, comprising a first short-circuit valve element and a second short-circuit valve element, a main valve element for arranging in a counterpart with respect to a connector to a coolant cooler, a distributor chamber, and a traverse for arranging between an engine outlet and an engine inlet, wherein the counterpart bounds the distributor chamber radially, wherein the traverse and the main valve element bound the distributor chamber on top and bottom sides of the distributor chamber, which traverse forms valve seats for the first short-circuit valve element and the second short-circuit valve element, wherein the traverse has, on its outer side, a collar which forms an axial abutment region for the counterpart and which is loaded in an axial direction by a compression spring such that the collar is forced in the direction of the counterpart, wherein at least two differently designed restoring elements are provided, wherein the first short-circuit valve element is mounted so as to be adjustable counter to the force of the first restoring element and the second short-circuit valve element is mounted so as to be adjustable counter to the force of the second restoring element, wherein one of the first restoring element and the second restoring element is arranged on an inner side of the traverse and the other is arranged on an outer side of the traverse, wherein the main valve element and the first short-circuit valve element are formed as an integral component.

12. A thermostat valve for a cooling system of an internal combustion engine with coolant stoppage function, comprising a first short-circuit valve element and a second short-circuit valve element, a main valve element for arranging in a counterpart with respect to a connector to a coolant cooler, a distributor chamber, and a traverse for arranging between an engine outlet and an engine inlet, wherein the traverse and the main valve element bound the distributor chamber on opposite sides of the distributor chamber, which traverse forms valve seats for the first short-circuit valve element and the second short-circuit valve element, wherein the traverse has, on its outer side, a collar which forms an axial abutment region for the counterpart and which is loaded in an axial direction by a compression spring such that the collar is forced in the direction of the counterpart, wherein at least two differently designed restoring elements are provided, wherein the first short-circuit valve element is mounted so as to be adjustable counter to the force of the first restoring element and the second short-circuit valve element is mounted so as to be adjustable counter to the force of the second restoring element, wherein the first and the second restoring elements are supported on opposite sides of the traverse such that only one of the first and second restoring elements is arranged inside the distributor chamber, wherein the main valve element and the first short-circuit valve element are formed as an integral component.

\* \* \* \* \*